Figure 1:
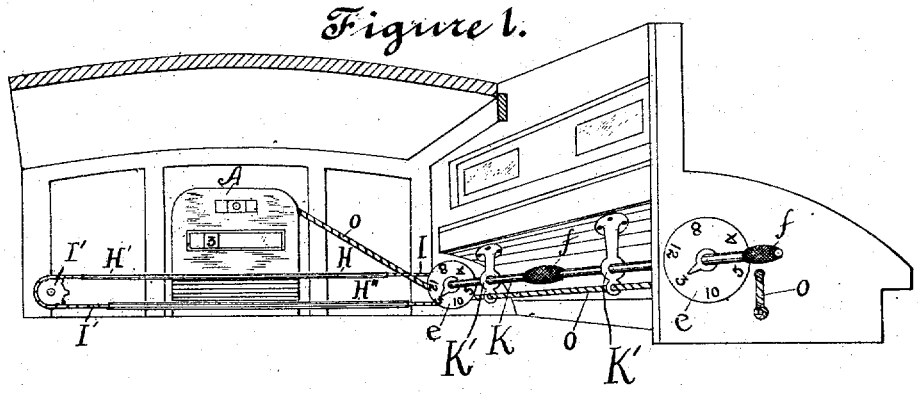

No. 11,867. Reissued Oct. 30, 1900.

J. F. OHMER & H. TYLER.

MECHANISM FOR OPERATING FARE REGISTERS.

(Application filed Aug. 15, 1900.)

4 Sheets—Sheet 1.

Witnesses:

Albert C. Bell.

Etha M. Smith

Inventors

J. F. Ohmer and Hiram Tyler.

By their Atty. Wm. H. Cooley.

No. 11,867. Reissued Oct. 30, 1900.
J. F. OHMER & H. TYLER.
MECHANISM FOR OPERATING FARE REGISTERS.
(Application filed Aug. 15, 1900.)
4 Sheets—Sheet 2.
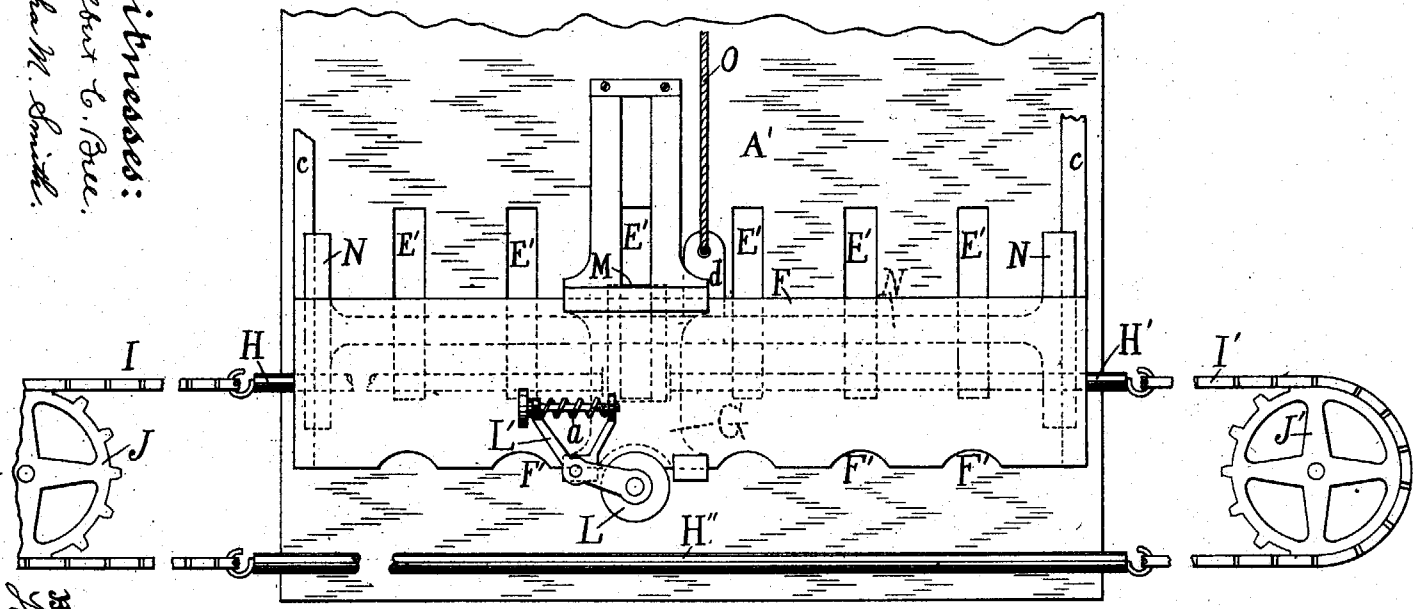
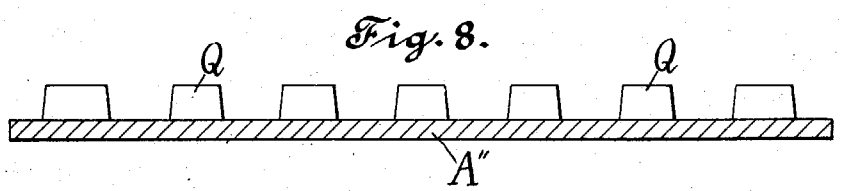
Witnesses:
Albert C. Bell.
Etha M. Smith.
Inventors
J. F. Ohmer
and Hiram Tyler.
By their Atty.
Wm. H. Cooley.

No. 11,867. Reissued Oct. 30, 1900.

J. F. OHMER & H. TYLER.

MECHANISM FOR OPERATING FARE REGISTERS.

(Application filed Aug. 15, 1900.)

4 Sheets—Sheet 3.

Witnesses:
Albert C. Bell.
Etha M. Smith.

Inventors
J. F. Ohmer
and Hiram Tyler.

By their Atty.
Wm. H. Cooley

No. 11,867. Reissued Oct. 30, 1900.

J. F. OHMER & H. TYLER.

MECHANISM FOR OPERATING FARE REGISTERS.

(Application filed Aug. 15, 1900.)

4 Sheets—Sheet 4.

Witnesses:
Albert C. Bell.
Etha M. Smith

Inventors
J. F. Ohmer,
and Hiram Tyler.
By their Atty.
W. H. Cooley.

UNITED STATES PATENT OFFICE.

JOHN F. OHMER AND HIRAM TYLER, OF DAYTON, OHIO, ASSIGNORS, BY DIRECT AND MESNE ASSIGNMENTS, TO THE OHMER CAR REGISTER COMPANY, OF ROCHESTER, NEW YORK.

MECHANISM FOR OPERATING FARE-REGISTERS.

SPECIFICATION forming part of Reissued Letters Patent No. 11,867, dated October 30, 1900.

Original No. 635,343, dated October 24, 1899. Application for reissue filed August 15, 1900. Serial No. 26,984.

*To all whom it may concern:*

Be it known that we, JOHN F. OHMER and HIRAM TYLER, citizens of the United States, residing at Dayton, in the county of Montgomery and State of Ohio, have invented certain new and useful Improvements in Mechanism for Operating Fare-Registers; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to means for operating fare-registers for street-cars.

The object of the said invention is to provide simple and reliable mechanism for operating a street-car register to register and indicate the several fares collected by the conductor. In some cases in connection with registers of this class several different operating devices have been made use of—one for each class of fare. In other cases a single operating device has been made use of, such operating device arranged to receive motion of two kinds, the class of fare selected being determined by the amount of motion of one kind, while the motion of the other kind imparted to such operating device actuated the desired individual-fare indicating and registering mechanism. It has been found objectionable in some instances to make use of a single operating-handle arranged to receive motion of two kinds in the way just above described, and a separate operating device for each class of fare has also been found objectionable when there are more than two kinds of fares to be registered and indicated. For obviating these difficulties we have devised a means whereby a single operating device arranged to receive motion of only one kind or in only one plane determines by the amount of such motion the particular class of fare to be indicated and registered, while the second operating device serves to register the fare selected by the position to which the first operating device has been last moved.

Figure 5:
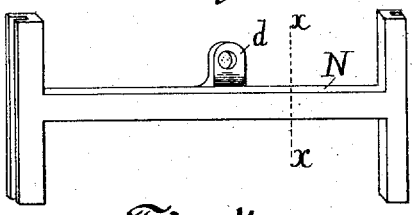
Figure 6:
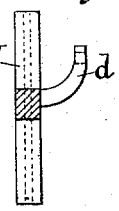
Figure 7:
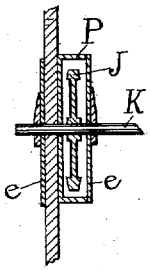
Figure 4:
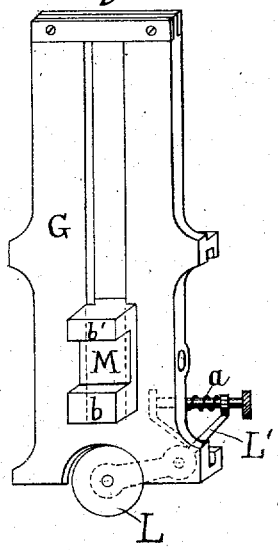
Figure 11:
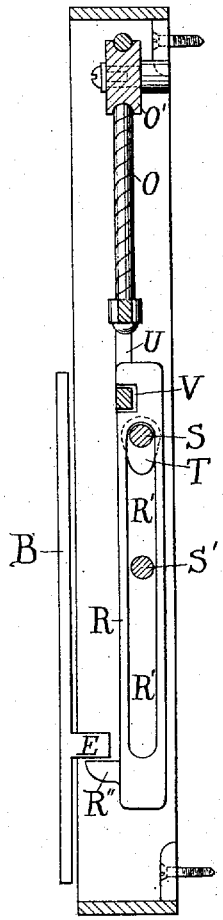
Figure 3:
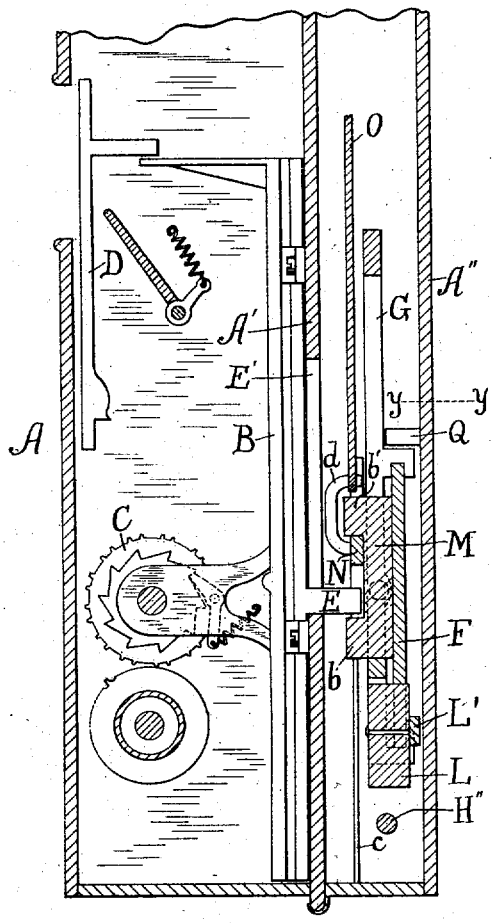
Figures 9, 10:
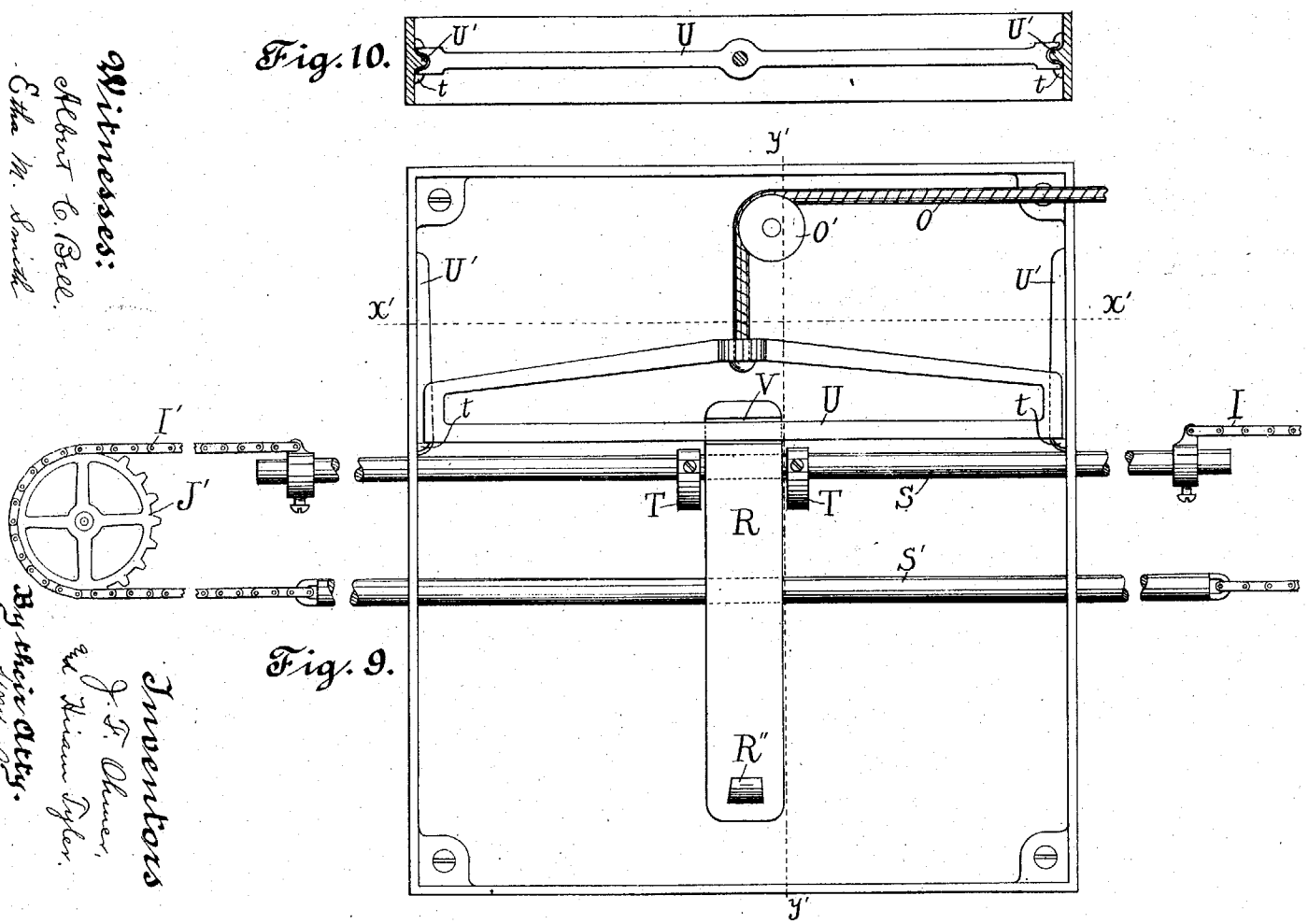

In the accompanying drawings, Figure 1 is a perspective view of a portion of the interior of a street-car in which a fare-register and operating devices are placed. Fig. 2 is a rear elevation showing the back of the register and the operating mechanism in position in the rear of said back. Fig. 3 is a vertical section through the fare-register and the operating mechanism. Fig. 4 is a perspective view, full size, of the horizontal reciprocable carriage and the slide thereon. Fig. 5 is a perspective view of the lifting-bar. Fig. 6 is a sectional view on line $x\,x$ of Fig. 5. Fig. 7 is a sectional view of one of the chain-wheels and its casing. Fig. 8 is a horizontal section of the rear side of the case inclosing the operating mechanism. (See line $y\,y$, Fig. 3.) Fig. 9 is an elevation of a modified construction. Fig. 10 is a section on line $x'\,x'$, Fig. 9; Fig. 11, a vertical section on line $y'\,y'$, Fig. 9.

In the following description of the invention similar letters of reference indicate corresponding parts in the several views of the drawings.

The fare-register A has a series of vertically-movable slides B, each one of which actuates a series of register-wheels C and a fare-display tablet D. These slides B are mounted to move up and down in the case, and each one of said slides has a lateral arm E, that projects through a vertical slot E′, there being such a slot for each one of said arms E to project through.

The present invention comprises means for actuating the slides B separately and at different times to operate the mechanisms of the register. This slide-operating mechanism may be inclosed in a case A″ in the rear of the register, as in Fig. 3, or it may be placed elsewhere. It consists of a transverse track F, having its ends firmly secured in any suitable manner and its lower edge formed with a series of semicircular recesses F′ in line with the slots E′ in the back of the register-case. A horizontal carriage G is mounted on this track and is movable back and forth thereon by rods H and H′, the ends of which have a connection with the said carriage and a lower parallel rod H″. These several rods are clearly shown in Fig. 2 and will be seen to have connection with chains I I′, which pass around chain-wheels J J′, one or both of which are tight on the hand operating rod or rods K, which are supported on brackets K′ on the car. (See Fig. 1.) The carriage G carries a locking-roller L, which is on a lever L′, pivoted to said carriage. This lever is pressed by a spring *a* to keep the roller against the lower edge of the track. As the carriage is moved from one point to another along said track the roller rides in and out of the recesses F′ and has the effect of arresting any unnecessary movement of the carriage. The said carriage further carries a vertical slide M, which has a shoulder *b*, which is movable below each of the arms E, and an upper shoulder *b′*, which engages with the transverse lifting-bar N. The said slide M is loosely confined within the carriage and in its horizontal movements with said carriage it is free from contact with the bar N and the arms E. The bar N slides up and down on tracks *c* on each side of the case A″ and has an arm *d* by which it is raised and lowered through means of an operating-rope O. The said rope passes out and runs along adjacent to the hand operating-rod K. The said rope may pass over sheaves at any suitable points. The chain-wheels are inclosed in casings P, attached to the front of the car. The rims of said casings have openings for the chains to pass out. As is shown in the drawings these casings have a fare-indicating dial *e*, with pointers *e′*. Such dials may be placed at suitable points along the operating rod or rods K. In order to prevent the slide M from being raised when it is not in a position to engage one of the arms E, there is provided a series of lugs or projections Q on the back of the casing A″. These lugs project out in line with the space between each two adjacent slots E′ in the back of the register-case and are in such position to prevent the slide from moving up. It will be understood that the extent of movement necessary to be imparted to the carriage G is equal to the space occupied by the slots E′. Therefore the diameters of the chain-wheels and the length of the chains are to be regulated accordingly. In registering and exposing the proper fare at the register and at the several dials simultaneously the conductor grasps one of the handpieces *f* on one of the operating-rods K and turns said rod until the pointers *e′* are moved to positions to indicate the fare collected. This movement of said rod likewise moves the chain-wheels thereon, and the longitudinal movement is imparted to the carriage through the rods connected to the chains. This movement brings the slide M to a position to engage with the arm E on the slide B in the register that operates in connection with the specific class of fares collected. The rope O is then pulled and the slide B elevated to turn the wheels C and expose the fare-indicator D.

Referring to Figs. 9, 10, and 11, this mechanism is different in some respects from that hereinbefore described and comprises a slide R, which alone performs the functions of both the carriage G and slide M. The said slide has an oblong slot R′ in it, through which the rods S and S′ pass. The upper rod S in the present case is one continuous rod instead of two rods H and H′, as in Fig. 2. T T designate two oblong collars screwed on rod S on each side of the slide R, by means of which the said slide is compelled to follow the movements of the rod S in either direction when said rod is moved longitudinally. The upper end of the slide engages with a vertically-sliding bar U by means of a slot V, and when the slide is moved to the proper point to engage with one of the register-slides B it may be lifted, the slot R′ permitting such movement. The lower horizontal edge of the lifting-bar U is arrested in its downward movement by lugs *t t* on the sides of the case. R″ is a lug projecting laterally from the lower portion of the slide on a plane below the arms E on the register-slides B. The lower rod S′ prevents any swinging movement of the slide R as it is being moved by the rod S. The lifting-bar is movable up and down on tracks U′ U′ by the operating-rope O, which is connected to it and is passed out over sheave O′. The operation of this mechanism is the same as that described, and shown in Fig. 2.

We do not wish to be restricted to the present means shown for moving the carriage or slide, as it is possible to do this by other and different means from those shown and described; but we desire to claim, broadly, a carriage or slide adapted to be moved to positions to engage with the slides of a street-car register and means for operating said slide or carriage and for actuating it to move the register-slides and also the first and second operating devices for selecting and registering, respectively.

Having described our invention, we claim—

1. In mechanism for operating street-car registers, the combination with a series of individual slides adapted to operate the mechanism of said register, of a slide movable to positions to engage with any one of said individual slides, and means for imparting movements to said slide.

2. In mechanism for operating street-car registers, the combination with a series of individual slides adapted to operate the mechanism of said register, of a carriage, a slide supported on said carriage and movable therewith to positions to engage with the slides in the register, and means for imparting movements to said carriage and to the slides thereon.

3. In mechanism for operating street-car registers, the combination with a series of slides adapted to operate the mechanism of said register, the said slides having arms or projections that project through slots in said register, of a carriage, a slide mounted on said carriage to move vertically, and adapted to be carried by the carriage to positions to engage with any one of the arms on the register-slides, a lifting-bar engaging with the slide on the carriage, substantially as and for the purposes specified.

4. In mechanism for operating street-car registers, the combination with a series of sliding bars arranged in said register and adapted to operate the mechanism of said register, of a carriage, an operating rod or rods on the car, connections between said rod or rods and the carriage, whereby a horizontally-reciprocating movement is imparted to said carriage, a slide carried on said carriage and adapted to engage with the sliding bars in the register, and means for actuating the said slide on the carriage to move the sliding bars in the register, substantially as specified.

5. In mechanism for operating street-car registers, the combination with a series of register-slides B with arms E, of a carriage adapted to be moved back and forth horizontally, a slide mounted on said carriage and adapted to be moved in a plane at right angles to the movement of the carriage, and mechanism substantially as described for operating said carriage and slide, as and for the purposes specified.

6. In combination with a series of independently-movable parts each arranged to operate its corresponding set of mechanism in a fare-register, an actuating device arranged to engage and operate each one individually of such independently-movable parts when in operative relation therewith, a first operating device for establishing an operative relation between such actuating device and a desired one of such independently-movable parts, and a second operating device for operating such actuating device and thereby also the desired one of such independently-movable parts, such operating devices arranged to be engaged and operated separately and independently by the hand of the operator.

7. In combination with a series of independently-movable parts each arranged to operate its corresponding set of mechanism in a fare-register, an actuating device arranged to engage and operate each one individually of such independently-movable parts when in operative relation therewith, a first operating device for establishing an operative relation between such actuating device and a desired one of such independently-movable parts, and a second operating device for operating such actuating device and thereby also the desired one of such independently-movable parts, such operating devices located adjacent to each other and arranged to be engaged and operated separately and independently by the hand of the operator.

8. In combination with a series of independently-movable parts each arranged to operate its corresponding set of mechanism in a fare-register, an actuating device arranged to engage and operate each one individually of such independently-movable parts when in operative relation therewith, a first operating device for establishing an operative relation between such actuating device and a desired one of such independently-movable parts, and a second operating device for operating such actuating device and thereby also the desired one of such independently-movable parts, such operating devices arranged to be engaged and operated separately and independently by the hand of the operator, and a common support for such first and second operating devices.

9. In combination with a series of independently-movable parts each arranged to operate its corresponding set of mechanism in a fare-register, an actuating device arranged to engage and operate each one individually of such independently-movable parts when in operative relation therewith, two independently-operating handles, means whereby the different movements of a first one of such handles establish an operative relation between such actuating device and the desired one of such independently-movable parts, and means whereby the movement of the second one of such handles operates such actuating device, and thereby also the desired one of such independently-movable parts.

10. In combination with a series of independently-movable parts each arranged to operate its corresponding set of mechanism in a fare-register, an actuating device arranged to engage and operate each one individually of such independently-movable parts when in operative relation therewith, two independently-operating handles located adjacent to each other, means whereby the different movements of a first one of such handles establish an operative relation between such actuating device and a desired one of such independently-movable parts, and means whereby the movement of the second one of such handles operates such actuating device and thereby also the desired one of such independently-movable parts.

11. In combination with a series of independently-movable parts each arranged to operate its corresponding set of mechanism in a fare-register, an actuating device arranged to engage and operate each one individually of such independently-movable parts when in operative relation therewith, two independently-operating handles, means whereby the different movements of a first one of such handles establish an operative relation between such actuating device and the desired one of such independently-movable parts, and means whereby the movement of the second one of such handles operates such actuating device, and thereby also the desired one of such independently-movable parts, and a common support for such first and second handles.

JOHN F. OHMER.
HIRAM TYLER.

Witnesses:
ROBT. C. PATTERSON,
R. W. BAGGOTT.